US011689280B2

(12) United States Patent
Mahalingam et al.

(10) Patent No.: US 11,689,280 B2
(45) Date of Patent: Jun. 27, 2023

(54) IDLE/INACTIVE MOBILITY AND REACHABILITY IN MOVING NETWORKS

(71) Applicant: InterDigital Patent Holdings, Inc., Wilmington, DE (US)

(72) Inventors: Nagi Mahalingam, San Diego, CA (US); Anantharaman Balasubramanian, San Diego, CA (US); Ravikumar Pragada, Warrington, PA (US); Dylan Watts, Montreal (CA); Yugeswar Deenoo, Chalfont, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/290,311

(22) PCT Filed: Oct. 30, 2019

(86) PCT No.: PCT/US2019/058867
§ 371 (c)(1),
(2) Date: Apr. 30, 2021

(87) PCT Pub. No.: WO2020/092566
PCT Pub. Date: May 7, 2020

(65) Prior Publication Data
US 2021/0376915 A1  Dec. 2, 2021

Related U.S. Application Data

(60) Provisional application No. 62/752,688, filed on Oct. 30, 2018.

(51) Int. Cl.
*H04B 17/309* (2015.01)
*H04B 7/185* (2006.01)
(Continued)

(52) U.S. Cl.
CPC ....... *H04B 7/18513* (2013.01); *H04B 7/0695* (2013.01); *H04B 17/309* (2015.01); *H04W 16/28* (2013.01); *H04W 72/542* (2023.01)

(58) Field of Classification Search
CPC ............... H04B 7/18513; H04B 7/0695; H04B 17/309; H04W 16/28; H04W 72/085
See application file for complete search history.

(56) References Cited

U.S. PATENT DOCUMENTS 6,191,734 B1 * 2/2001 Park .................. H01Q 3/06
342/359
10,177,837 B2 * 1/2019 Ravishankar ...... H04B 7/18513
(Continued)

FOREIGN PATENT DOCUMENTS

WO  WO-2016179037 A1 * 11/2016  ........... H04B 7/1851
WO  2016205765 A1  12/2016
(Continued)

OTHER PUBLICATIONS

3GPP TR 23.737 VO.2.0, "Study on architecture aspects for using satellite access in 5G (Release 16)", 3rd Generation Partnership Project (3GPP); Technical Specification Group Services and System Aspects, Jul. 2018, 18 pages.
(Continued)

*Primary Examiner* — Hai V Nguyen
(74) *Attorney, Agent, or Firm* — Condo Roccia Koptiw LLP

(57) ABSTRACT

A wireless transmit/receive unit (WTRU) may identify a plurality of candidate satellite constellations. The WTRU may determine an elevation angle and/or an orbit associated with each of the plurality of candidate satellite constellations. The WTRU may select a satellite constellation from the plurality of candidate constellations for sell selection. The WTRU may identify a plurality of candidate beams associated with the selected satellite constellation. The
(Continued)

WTRU may determine an RSRP/RSRQ for each of the plurality of candidate beams. The WTRU may determine a weighted ranking of the plurality of candidate beams. The WTRU may determine the weighted ranking using the determined RSRP/RSRQ, prevailing load intensities, elevation angle, dwelling duration, link switch probability, and/or a quality of service (QoS). The WTRU may select a beam from the plurality of candidate beams for cell selection. The WTRU may select the beam based on the weighted ranking.

20 Claims, 11 Drawing Sheets

(51) Int. Cl.
*H04B 7/06* (2006.01)
*H04W 16/28* (2009.01)
*H04W 72/542* (2023.01)

(56) References Cited

U.S. PATENT DOCUMENTS

| | | | | |
|---|---|---|---|---|
| 10,455,475 | B1* | 10/2019 | Ahluwalia | H04B 7/18558 |
| 10,506,483 | B1* | 12/2019 | Williamson | H04B 7/18584 |
| 10,667,264 | B2* | 5/2020 | Torres | H04L 45/28 |
| 11,026,231 | B2* | 6/2021 | Torres | H04W 24/02 |
| 2002/0144984 | A1* | 10/2002 | Mori | B23K 26/244 |
| | | | | 219/121.64 |
| 2002/0177465 | A1 | 11/2002 | Robinett | |
| 2017/0366251 | A1* | 12/2017 | Ravishankar | H04B 7/18513 |
| 2018/0316414 | A9* | 11/2018 | Ravishankar | H04B 7/18541 |
| 2020/0036435 | A1* | 1/2020 | Ravishankar | H04B 7/18515 |
| 2020/0053724 | A1* | 2/2020 | MolavianJazi | H04W 52/146 |
| 2022/0052753 | A1* | 2/2022 | Speidel | H04W 16/10 |
| 2022/0200707 | A1* | 6/2022 | Nielsen | H04B 17/382 |
| 2022/0256445 | A1* | 8/2022 | Sedin | H04W 48/18 |
| 2022/0342082 | A1* | 10/2022 | Zhang | G08B 21/18 |
| 2022/0377638 | A1* | 11/2022 | Jung | H04W 36/08 |
| 2022/0377698 | A1* | 11/2022 | Wang | G01S 13/765 |

FOREIGN PATENT DOCUMENTS

| | | | | |
|---|---|---|---|---|
| WO | WO-2016205765 | A1 * | 12/2016 | H04B 7/18508 |
| WO | WO-2017189862 | A1 * | 11/2017 | H04B 7/1851 |
| WO | WO-2020202121 | A1 * | 10/2020 | H04B 7/18513 |
| WO | WO-2022038510 | A1 * | 2/2022 | |
| WO | WO-2022060493 | A1 * | 3/2022 | |

OTHER PUBLICATIONS

Priscoli, Francesco D., "Architecture of on Integrated GSM-Satellite System", European Transactions on Telecommunications and Related Technologies; AEI; Milano, IT, Sep. 1, 1994, 9 pages.
TDOC R2-1814931, "Spot beam versus cell in NTN NR", 3rd Generation Partnership Project (3GPP); Ericsson, 3GPP TSG-RAN WG2 #103bis, Oct. 8-12, 2018, 6 pages.

* cited by examiner

IDLE/INACTIVE MOBILITY AND REACHABILITY IN MOVING NETWORKS

This application is the National Stage Entry under 35 U.S.C. § 371 of Patent Cooperation Treaty Application No. PCT/US2019/058867, filed Oct. 30, 2019, which claims the benefit of U.S. Provisional Patent Application No. 62/752,688, filed Oct. 30, 2018, the contents of which are incorporated by reference it its entirety.

CROSS-REFERENCE TO RELATED CASES

This application claims the benefit of U.S. Provisional Patent Application No. 62/752,688, filed Oct. 30, 2018, the contents of which are incorporated by reference it its entirety.

BACKGROUND

Satellites may occupy one of several orbital classes. In the low earth orbit (LEO) class, satellites may be at altitude 400-2000 kilometers with the common altitude being 700 kilometers. In the medium earth orbit (MEO) class, satellites may be at an altitude of 2000-32000 kilometers with the common altitude being 20000 kilometers. In the geo-synchronous (GSO) or geo-stationary orbit (GEO), satellites may be quasi-fixed at approximately 36000 kilometers. With higher altitudes, propagation delay and power budgets may be issues, while with lower altitudes, Doppler and mobility may be issues. With lower orbits, satellites experience atmospheric drag and per Kepler's laws of planetary motion. The lower orbital altitude may be associated with higher angular velocity of the satellite.

SUMMARY

A wireless transmit/receive unit (WTRU) may identify a plurality of candidate satellite constellations. The WTRU may receive system information. The system information may indicate constellation assistance information. The constellation assistance information may include satellite ephemeris data and/or group common timing offset(s). The plurality of candidate satellite constellations may be identified using the constellation assistance information. The plurality of candidate satellite constellations may be identified using one or more previous measurements and/or previously received system information. The plurality of satellite constellations may include one or more of a low earth orbit (LEO) satellite, a medium earth orbit (MEO) satellite, or a geo-stationary orbit (GEO) satellite. The WTRU may determine an elevation angle and/or an orbit associated with each of the plurality of candidate satellite constellations. The elevation angle may be an average elevation angle for the satellites in a respective constellation. The WTRU may select a satellite constellation from the plurality of candidate constellations for sell selection. The satellite constellation may be selected based on one or more of the determined elevation angles, received signal received power (RSRP)/received signal receive quality (RSRQ) measurements associate with the plurality of satellite constellations, and/or a link budget associated with the WTRU. When multiple candidate satellite constellations have suitable RSRP/RSRQ, the selected satellite constellation may have a smaller average elevation angle than the other candidate satellite constellations in the plurality of satellite constellations.

The WTRU may identify a plurality of candidate beams associated with the selected satellite constellation. The WTRU may determine an RSRP/RSRQ for each of the plurality of candidate beams. The WTRU may determine a weighted ranking of the plurality of candidate beams. The WTRU may determine the weighted ranking using one or more of the determine RSRP/RSRQ, a candidate beam elevation angle prevailing load intensities of the candidate beams, a dwelling duration, a link switch probability, or a quality of service (QoS) parameter associated with the uplink data. The QoS parameter may include a minimum propagation delay for the uplink data. The weighted ranking may prioritize dwelling duration of the plurality of candidate beams. The WTRU may select a beam from the plurality of candidate beams for cell selection. The WTRU may select the beam based on the weighted ranking. The WTRU may determine that the WTRU is within a satellite footprint edge prior to identifying the plurality of candidate satellite constellations. The plurality of candidate beams may be associated with a beam edge. The selected beam may have a maximum weighted ranking of the plurality of candidate beams associated with the beam edge.

DETAILED DESCRIPTION

Figure 1A:
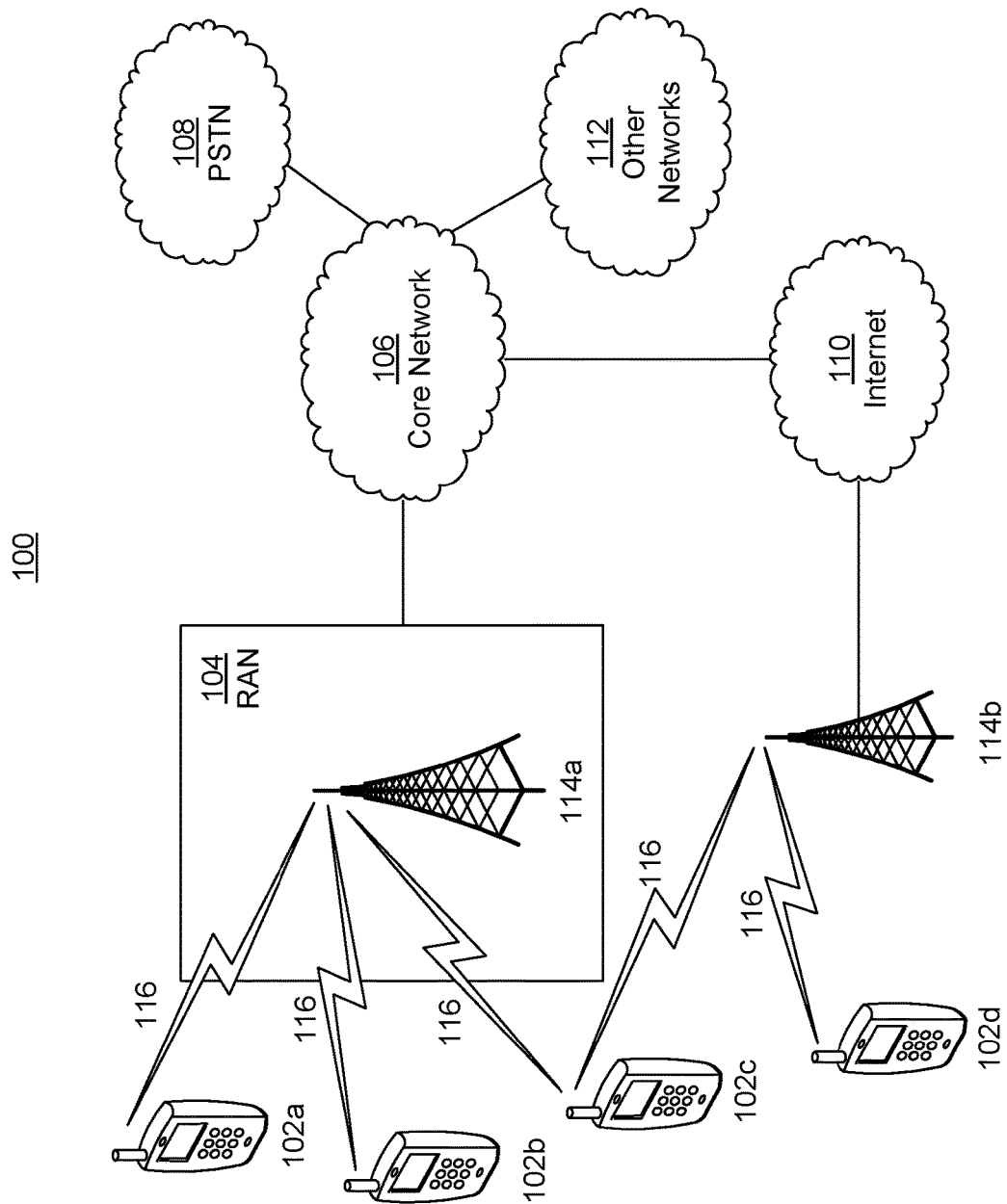
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
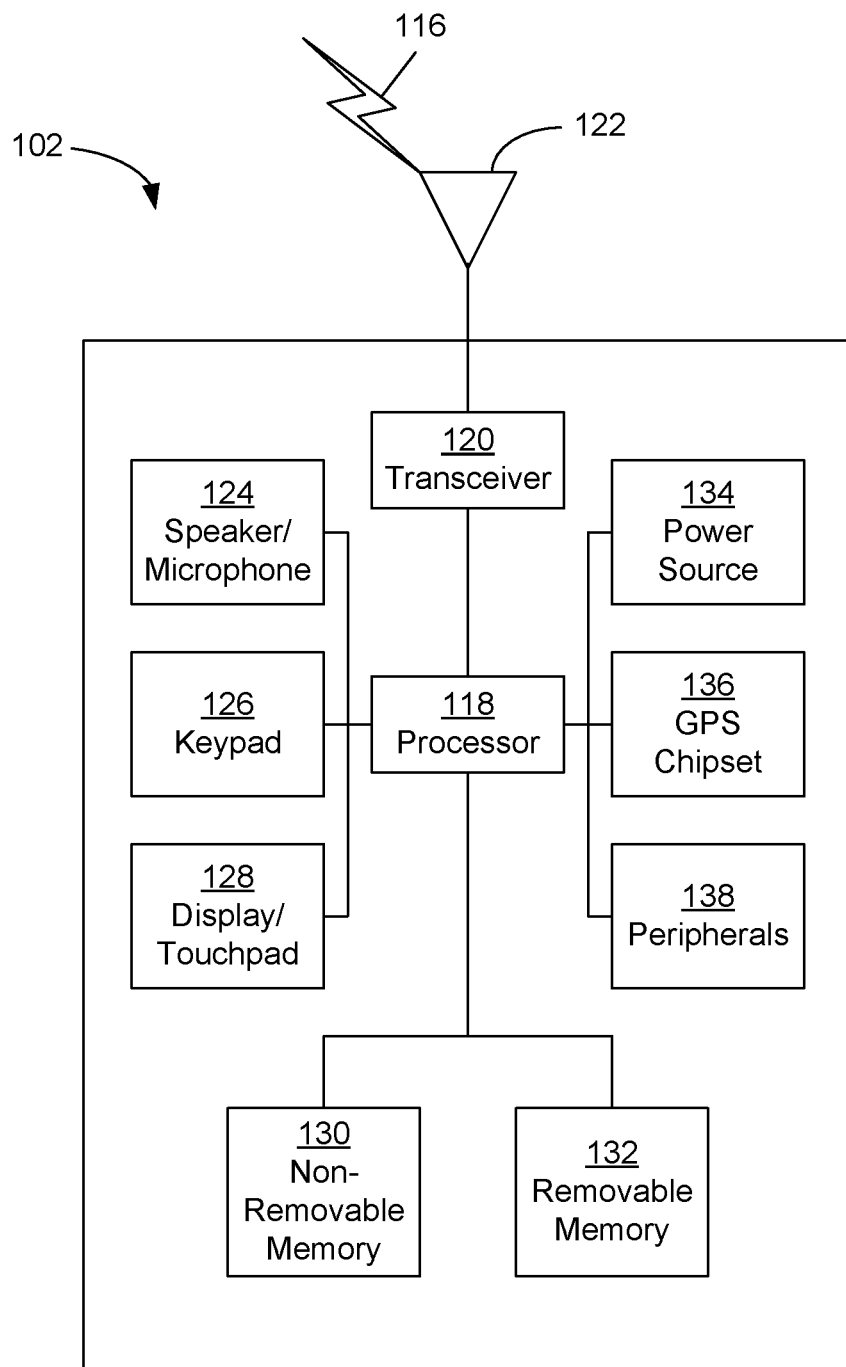
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
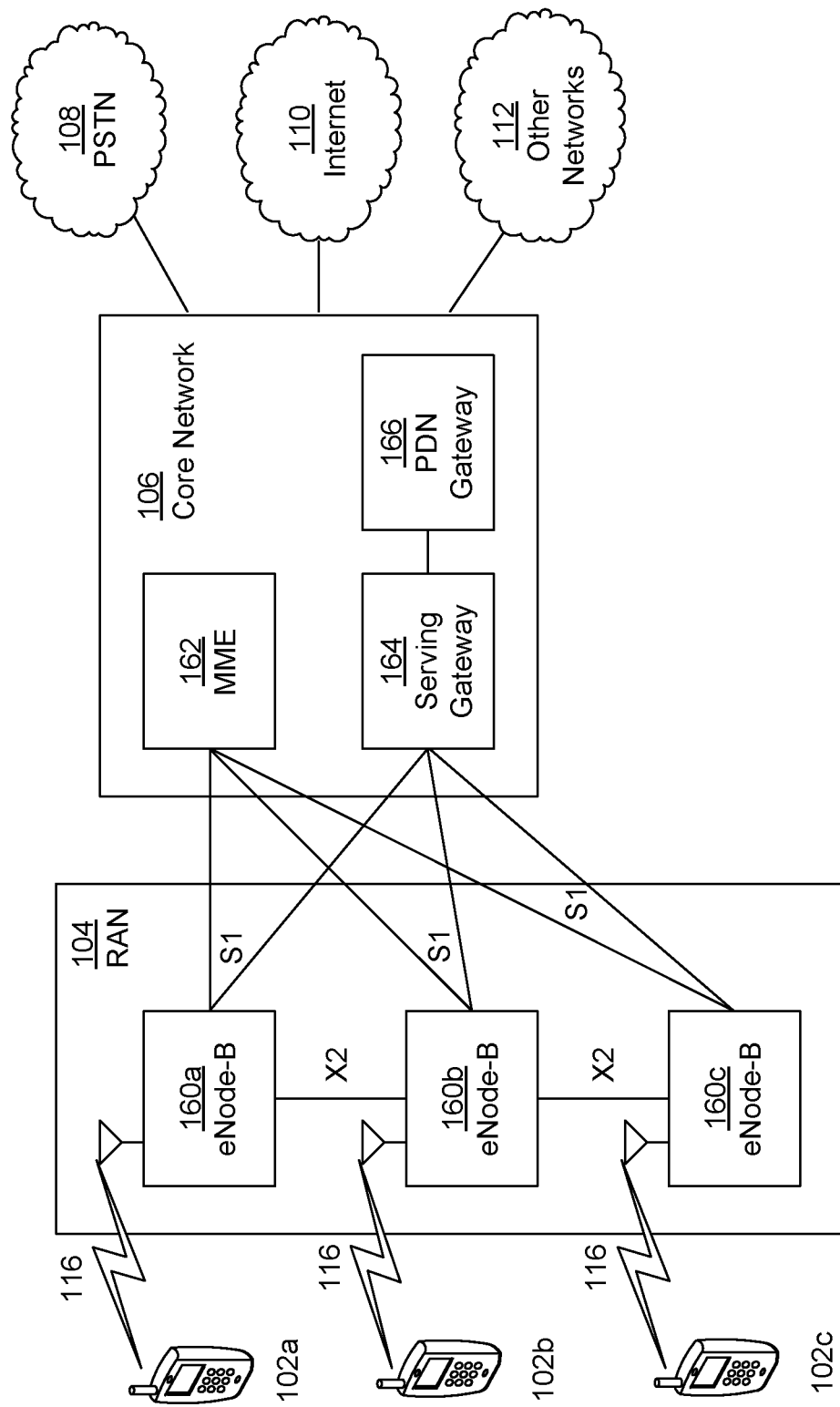
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
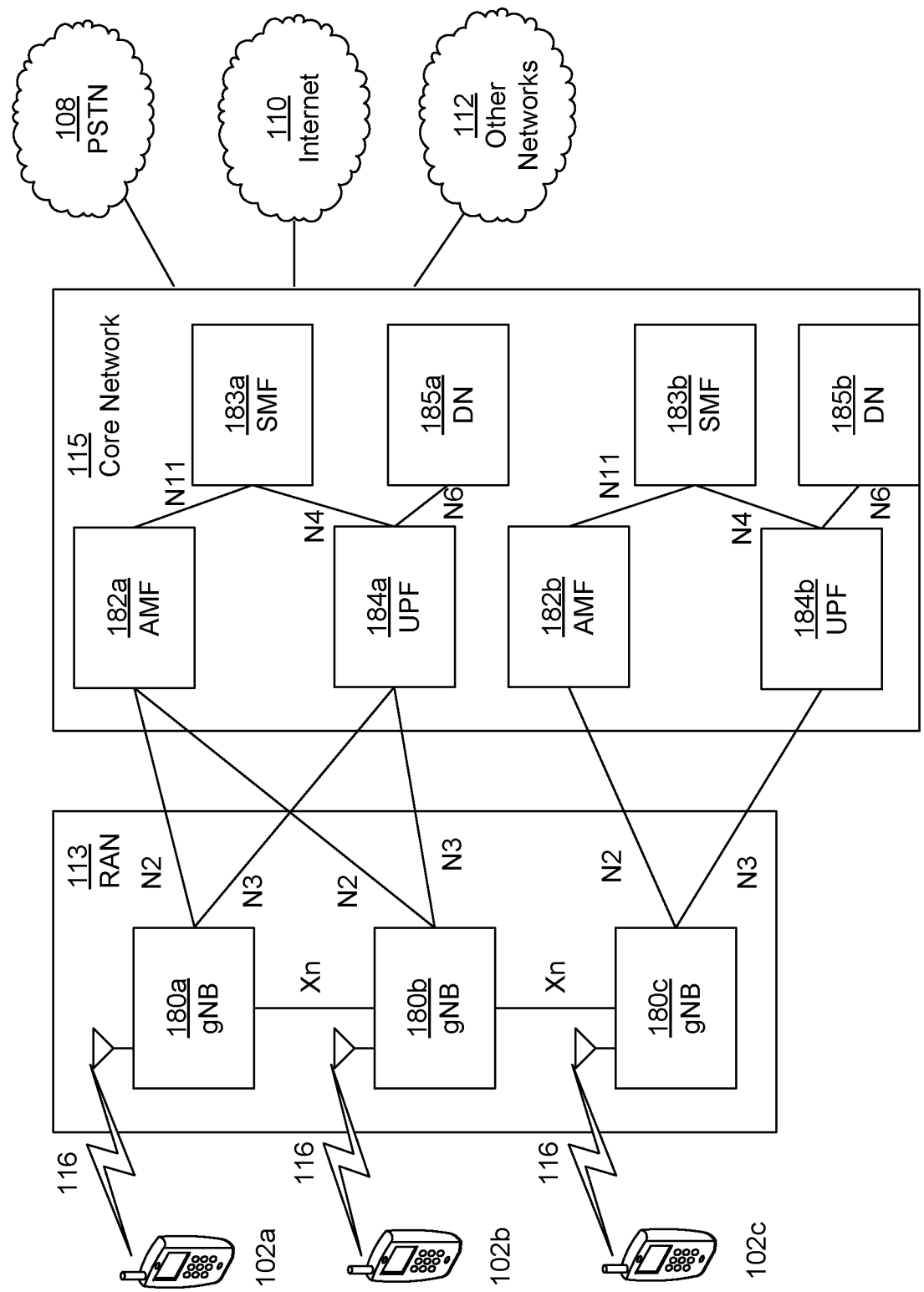
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Satellite systems play an invaluable part in enabling communications in places where the last mile fiber cable or terrestrial mobile telephony is unviable. Satellite services may be supplementary to terrestrial cellular and land-based communication systems. Satellite services may facilitate broadcast applications such as television and provided emergency, essential services to offshore oil-rigs and shipping industries. Satellites may provide true broadband connectivity to terrestrial users complementing land-based mobile and fixed wireless systems. The volume of users utilizing satellite-based services may include those who can afford or to those who have no other alternatives. For satellites to become a pervasive and viable technology, the volume of users that can be supported may increase, and unicast services in addition to existing broadcast services may become more prevalent. With an increase in user count, the volume of data serviceable may increase.

To dimension systems with good and acceptable link budgets, commercial communications satellites may be LEO or MEO in the medium term and on very high frequencies. With very high velocity satellites, the Doppler may be very high and this poses issues with synchronization and time for fix. Satellite link budgets are built with high link margins to overcome rain and other atmospheric aberrations that may arise during a communication. The Signal-to-Interference Ratio (SINR) experienced on the downlink and uplink may be low. The highest modulation-coding schemes employed in satellite links may be several orders lower than what is comparable in terrestrial systems. Long propagation delays involving satellite links may be several orders larger than observed in a terrestrial system. Long propagation delays may pose issues enforcing efficient power control loops. This may cause the satellite terminals and ground stations to perform with incorrectly set operating points.

A WTRU may apply maximum weighted cell selection based on link elevation angle and/or penalty factor to apply for using an edge link, dwelling duration, link switch probability, and/or propagation delay for a given service. A WTRU may be configured for terrestrial zone-based paging based on geo-fence's boundaries that are scaled down (e.g., decreased) or scaled up (e.g., increased) as a function of relative velocity between the WTRU and the satellite.

Figure 2:
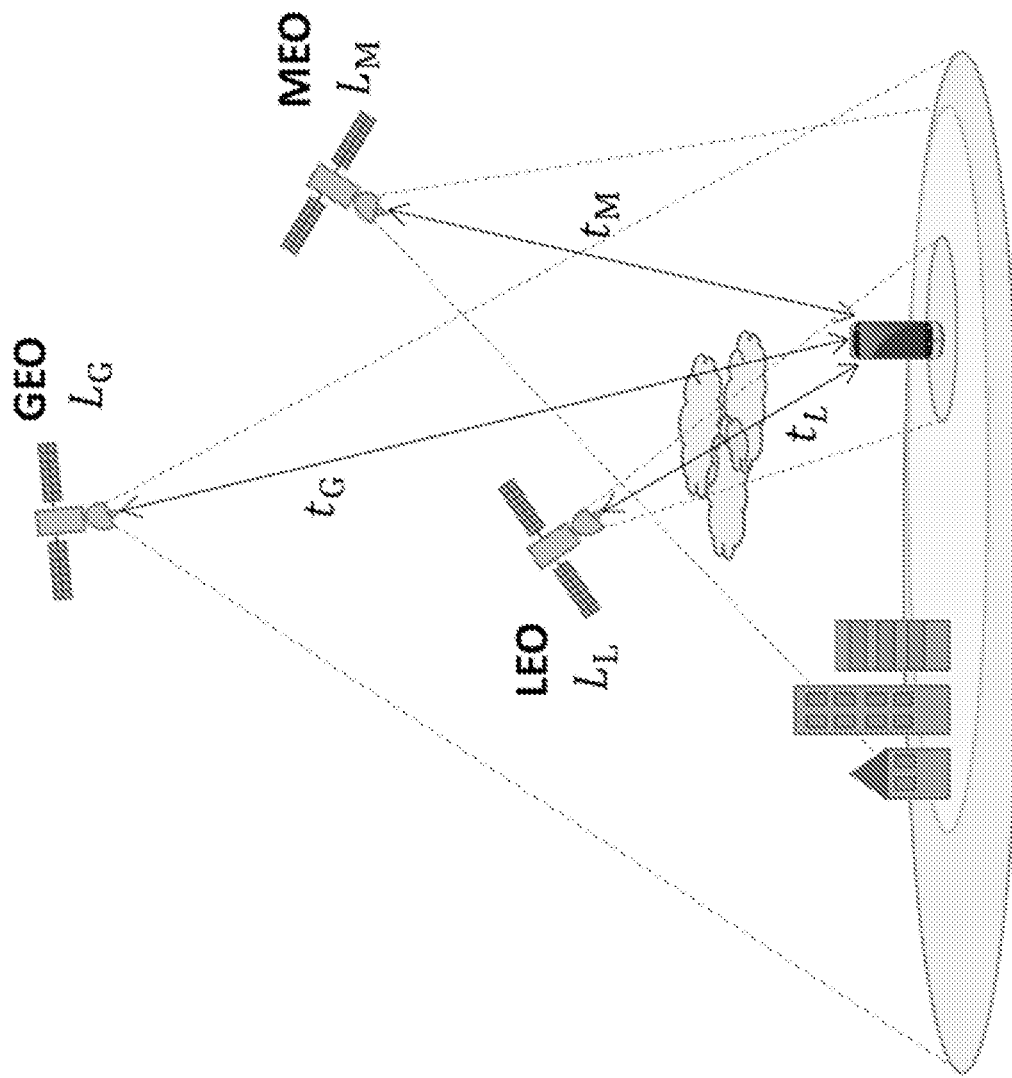
FIG. 2 shows an example WTRU covered by multiple orbital classes of satellite.

FIG. 2 shows an example scenario 200 where a WTRU is covered by multiple orbital classes of satellite. For example, the WTRU may be covered by a Geostationary (GEO) satellite, a Medium Earth Orbit (MEO) satellite, and/or a Low Earth Orbit (LEO) satellite. Each of the satellites may be associated with a propagation delay and/or a link budget. For example, the GEO satellite may be associated with a first propagation delay, $t_G$ and a first link budget, $L_G$. The MEO satellite may be associated with a second propagation delay, $t_M$ and a second link budget, $L_M$. The LEO satellite may be associated with a third propagation delay, $t_L$ and a third link budget, $L_L$. The WTRU may select the GEO satellite, the MEO satellite, or the LEO satellite based on the propagation delays and/or the link budgets associated with each satellite. Satellite classes (e.g., LEO, MEO, GEO, etc.) may also be referred to as satellite type(s).

Satellite links, though reliable, may suffer from high latencies. Services that use TCP as the transport layer may be especially susceptible to latency and performance degrades.

Cell selection may be performed. A WTRU may scan a list of carriers by measuring the reference signal strength indicator (RSSI) of a carrier (e.g., each carrier) over predetermined system bandwidths. The measured RSSI on a carrier may include the signal strength of any desired cells operating on the carrier, interfering cells on the carrier, as well as noise. The WTRU may subsequently filter out and discount carriers whose RSSI is lower than a predefined threshold. The surviving list of carriers may be used for determining presence of candidate cells.

The WTRU may attempt to identify cell identification blocks on each surviving carrier until the WTRU find a cell to camp. Cell identification procedure may include detecting the primary synchronization signal (PSS) and secondary synchronization signal (SSS). Detecting the PSS and SSS may allow the WTRU to determine the cell's frame and subframe boundaries in addition to ascertaining the physical cell identity (PCI). Knowing a PCI, the position of the pilot symbols (e.g., reference signals in LTE) may be unambiguously known, allowing the WTRU to determine pilot power (e.g., reference signal received power, RSRP) and reference signal received quality (RSRQ) of the candidate target cells.

If there are several such candidate cells for selection, the WTRU may rank the candidates in descending order of RSRP and acquires system information blocks starting with the highest ranked candidate. A parameter $QRXLEV_{MIN}$ broadcast in the candidate cell's system information may mandate the minimum required RSRP and/or RSRQ for the WTRU to consider the cell viable, e.g., the current, ($RXLEV > QRXLEV_{MIN}$). The system information acquired from the candidate cell may indicate whether the cell is allowed for camping. e.g., not access barred, cell barred or reserved for operator use. If the current highest ranked candidate is barred or reserved or if $QRXLEV_{MIN}$ is not met, the WTRU may move on to the next highest ranked candidate in the list, acquire system information and repeat the procedure as necessary. When a candidate cell passes acceptance criteria, the WTRU may perform via the candidate cell a non-access stratum (NAS) procedure to ATTACH and/or NAS: TRACKING AREA UPDATE with the core network.

Cell selection may refer to a beam pair selection, e.g., in addition to or in lieu of, the process of cell selection. Selection of a beam may correspond to selection of a reference signal or reference signal configuration associated with the beam. Maximum array gain may be obtained in NR when TX and RX beams are perfectly aligned. In a system with narrow beams, misalignments between TX and RX beams may result in a substantial loss in the received power. Hence, in NR, a serving cell may be found by time division beam switching in which transmit beams of candidate cells and receive beams of WTRUs may be swept to measure SNRs of potential links. Time division beam switching may be employed to find the serving cell with the best beam pair in the cell selection and handover stages.

In time division beam switching, individual TX beams may be transmitted from the base station until the TX beams (e.g., all TX beams) are transmitted. At the WTRU, RX beam sweep may be performed for the TX beams to measure the SNR for the TX-RX beam pairs. The measurement of possible TX-RX beam pairs may be performed for candidate cells to select a serving base station with the best beam pair. The WTRU may first maintain in descending order, the list of TX-RX beams with highest SNR and the associated cells.

A physical cell ID (PCI) of the serving cell may obtained in NR by detecting the PSS and SSS transmitted from the serving cell. For cell selection, the beam pair with maximum SNR may be tentatively selected and the corresponding cell with the physical cell ID as the serving cell. The tentatively selected cell plus beam pair may or may not be optimal for hybrid beamforming, as the effects of the multipath channel may not be considered in the selection stage. The system information from this selected cell may be acquired to determine if $QRXLEV_{MIN}$ is met and if the cell is allowed for access, for example, not cell barred or reserved for operator use. When a NR candidate cell passes acceptance criteria, the WTRU may perform via the candidate cell a non-access stratum (NAS) procedure to NAS: ATTACH and/or NAS: RADIO NETWORK AREA UPDATE (RNA UPDATE) with the core network.

The selected cell for camping may be referred to as the serving cell.

The cell reselection may be performed, e.g., similar to cell selection. Once a cell is initially selected (e.g., cell selection), a neighbor cell may not be monitored constantly, when the WTRU is stationary and experiences adequate signal strength and quality from the serving cell. The serving cell may broadcast in system information parameters controlling whether to perform measurements on neighboring cells. The neighboring cells may be intra-frequency, inter-frequency or inter-Radio access technology (RAT) neighbors. To measure inter-frequency and inter-RAT neighbors, the WTRU may tune to a different frequency to perform measurements and tune back to serving frequency when complete.

The process of measuring neighbors that are not co-channel (same frequency as currently camped on frequency) may be an expensive option. The network may configure a WTRU to monitor intra-frequency neighbors and inter-frequency/inter-RAT neighbors differently. A parameter $S_{IntraSearch}$ may indicate when the WTRU is to perform measurements on intra frequency (co-channel) neighboring cells whereas, a parameter $\leq S_{NonIntraSearch}$ may indicate when the WTRU is to perform measurements on inter-frequency and/or inter-RAT neighboring cells. On a condition that the current measured serving cell power (RSRP) and/or quality (RSRQ) are $S_{IntraSearch}$ or $S_{NonIntraSearch}$, the WTRU may commence measurements on co-channel neighbors or inter-frequency/inter-RAT neighbors respectively. The measurements may include received signal power (RSRP) or received signal quality (RSRQ). Parameter $S_{IntraSearch}$ may be specified as $S_{IntraSearchP}$ and $S_{IntraSearchQ}$ and similarly, $S_{NonIntraSearch}$ may be specified as $S_{NonIntraSearchP}$ and $S_{NonIntraSearchQ}$. These parameters may be broadcast by the serving cell in system information.

In NTN, cell reselection may be performed based on predictable path profiles of satellite spotbeams and/or uneven loading of spotbeams within a NTN's footprint.

One or more cells are grouped into a "tracking area," and the tracking area may be assigned a tracking area code (TAC). In NR, one or more cells may be grouped into a "radio network area," and the radio network may be assigned a radio network area code (RNA Code). A cell may be associated with one (e.g., and only one) TAC or RNA code. Cells in LTE and NR may broadcast in system information their TAC and RNA Code respectively. A WTRU registering with the core network via a LTE or NR cell may indicate to the core network the TAC or RNA code of the access cell.

The core network may store in the WTRU's context the TAC or RNA code through which the WTRU was last tracked and monitored. When a WTRU reselects a cell, and if the TAC or RNA code of the cell is different from the TAC or RNA code of the immediately previously camped cell, it may notify the new TAC or RNA code to the network. The network may determine the position of the WTRU within the accuracy of a TAC or RNA code and may restrict the PAGING message to cells sharing the TAC or RNA code when the WTRU needs to be reached in IDLE mode. For better accuracy of tracking at a cell level, a network may assign different TAC/RNA Code to immediately neighboring cells, so that the WTRU may notice a TAC/RNA Code change and may perform a NAS: TA UPDATE and/or NAS: RNA UPDATE procedure upon a change of cell. The network may group many cells into one TAC or RNA code. A WTRU reselecting from one cell from another cell may witness the same TAC/RNA Code being broadcast on their respective system information and may skip performing the NAS: TA UPDATE or NAS: RNA UPDATE procedure. In an example, a WTRU may be unknown to the network at a cell level, rather, may be known within the accuracy of a group of cells. The core network may page for the WTRU in the group of cells sharing the TAC/RNA Code.

The WTRUs may be tracked at the core network, while achieving a compromise between PAGING load on downlink and TA UPDATE/RNA UPDATE on the uplink. In NTN, the spotbeams may constantly move with respect to a position on earth. A spotbeam, synonymous with cells in NR and LTE, may be identified by a TAC or RNA code. The WTRU on ground, though perfectly stationary, may observe the spotbeams constantly moving overhead and coincidentally, the TAC or RNA code changing constantly.

Figure 3:
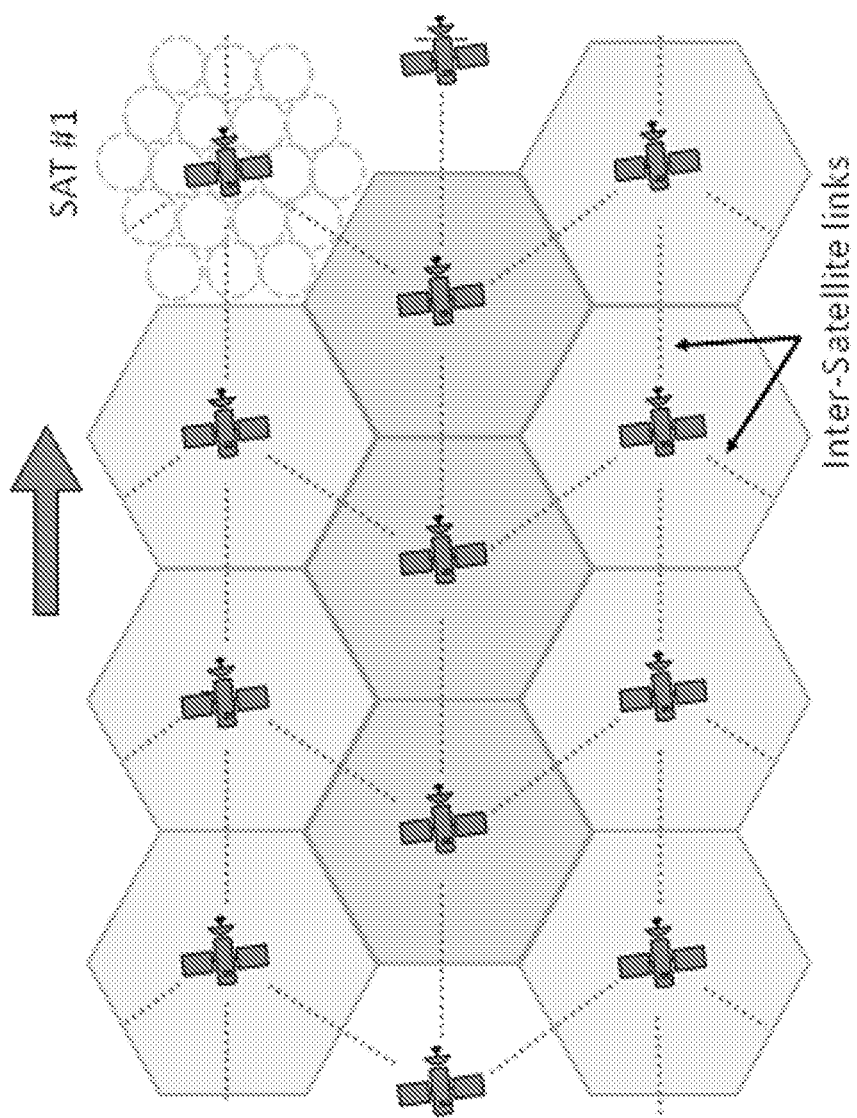
FIG. 3 shows example non-terrestrial networks (NTN) footprint and direction of movement.

FIG. 3 shows an example satellite constellation 300. As shown, there may be 3 orbits in this example constellation 300, with each orbit shaded differently. Several satellites may make up the constellation, and an orbit may be associated with a certain number of satellites. The direction of movement, the velocity and position in space of the satellite with respect to a specific position on earth, the number of satellites in a specific orbit belonging to a constellation may be preconfigured and/or determined.

There may be minor fluctuations in the earth's gravity and external influences that act on a satellite forcing minute variations to operating parameters of the satellite. In a specific orbit with respect to a specific position on earth, the satellite $SAT_j$ that preceded a currently serving satellite $SAT_i$ and the satellite $SAT_k$ that will succeed subsequently may be determined. From FIG. 3, multiple satellites may serve an orbit and the direction of movement of those satellites within the constellation. The footprint of the satellite may include the total surface area covered by the various transmitters at the satellite.

As shown in FIG. 3, a hexagonal shape may be approximated to show the footprint of the respective satellite immediately above. Though the footprints are shown to conform to perfect hexagon shapes, this may not be strictly possible, and there may be some bleeding of coverage from nearby satellites into one satellite's footprint. A satellite's footprint may be split into multiple spotbeams. As shown, an example satellite SAT #1 may be at the top of the $1^{st}$ orbit with multiple spotbeams within its footprint. The spotbeams can be evenly or unevenly sized and shaped within a footprint. A WTRU over a specific point on earth can be classified as, but not limited to, 1) in spotbeam center, 2) in spotbeam edge, 3) in footprint center, and/or 4) footprint edge. The WTRUs at spotbeam edge may reselect a spotbeam. The WTRUs at footprint edge may reselect a satellite. The WTRUs at the constellation edge or service edge may reselect a different constellation. The Constellation #X may include two orbits, and a WTRU at the edge of Constellation #X may be serviced by satellites in Constellation #Q. A WTRU with respect to a constellation 'recedes' opposite to the direction of satellite's movement as shown by the differently shaped arrow heads in FIG. 4.

Figure 4:
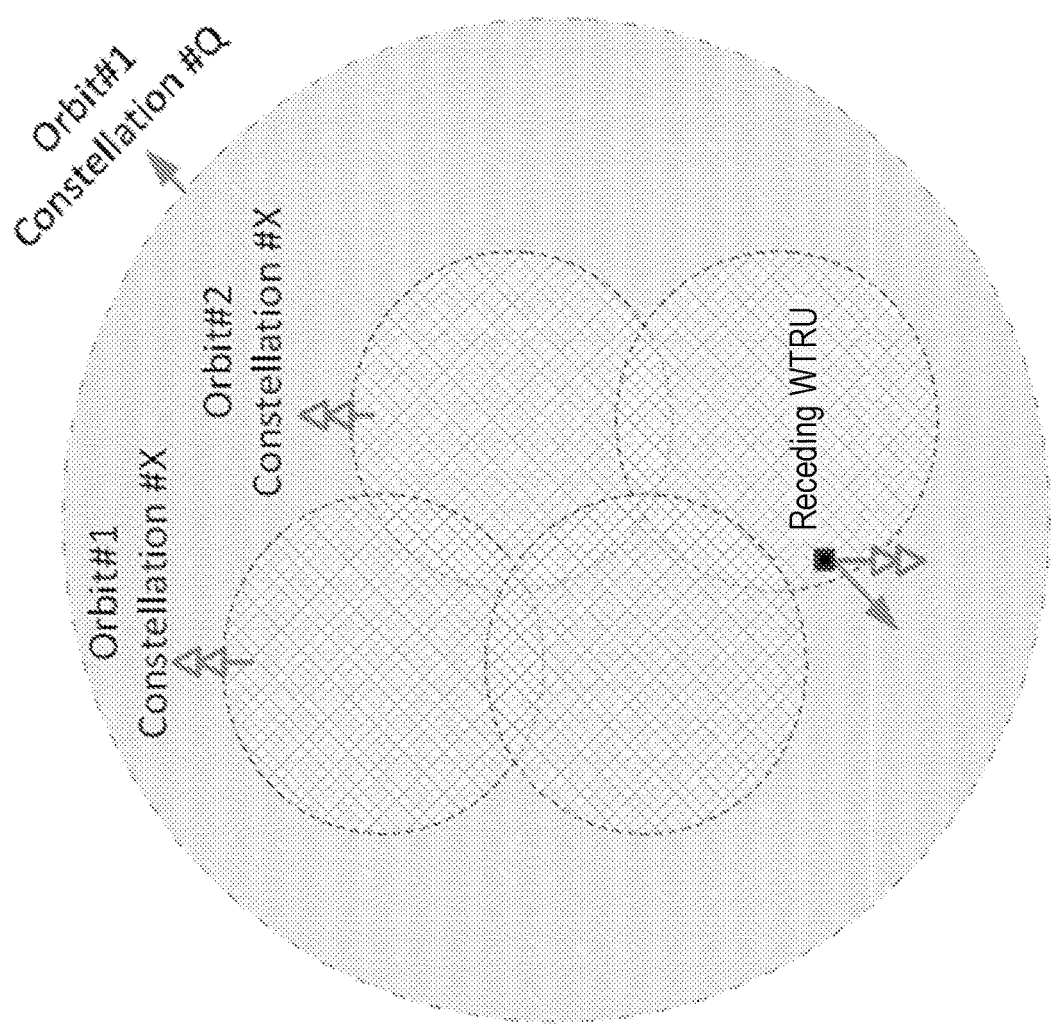
FIG. 4 shows example intra-orbit, inter-orbit and inter-constellation movement.

FIG. 4 depicts an example scenario 400 where multiple satellites in different constellations are near a WTRU. As shown in FIG. 4, satellites in different constellations may have different orientations and direction of movement. For example, the footprint of satellites in Constellation #X in FIG. 4 may be much smaller than the footprint of a satellite in Constellation #Q. For example, satellites in Constellation #Q may have higher orbital altitudes compared with satellites in Constellation #X. For example, satellites in the constellations may have differing elevation angles. A geography may be served by one or more constellations, and the services provided by the constellations may differ. For example, Constellation #Q may only provide voice and other premium, low data-rate services, whereas Constellation #X may provide traditional, low tariffed broadband services. The link budget associated with Constellation #Q may be several orders higher than the link budget associated with connections with Constellation #X. A WTRU may preferentially choose a constellation based on service need, available link budgets and/or additional link constraints indicated in system information from a satellite.

In an example, a satellite can provide service to a qualified WTRU in its footprint if the elevation angle between the WTRU and the satellite is $\theta_{min}$ or larger. Parameter $\theta_{min}$ may be broadcast in system information by the satellite, and the WTRU may read this parameter as part of cell selection and/or reselection. The WTRU may determine a possible list of satellites across one or more constellations that are visible in the horizon, may receive minimum elevation angle indications (e.g., parameter $\theta_{min,i}$) from system information from the respective satellites, where i refers to the satellite. If the measured elevation angle $\varepsilon_i$ to satellite i is less than $\theta_{min,i}$, the satellite may be removed from the list.

Figure 5A:
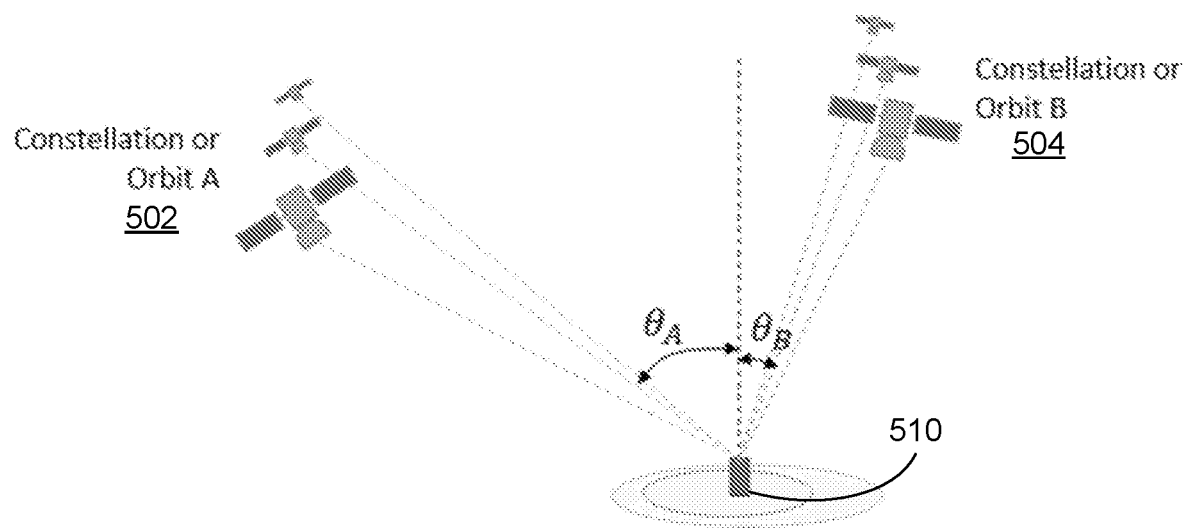
FIG. 5A shows example constellations/orbits with different elevation angles.

FIG. 5A shows example constellations 502, 504 with different elevation angles (e.g., average elevation angles) from a WTRU 510. The WTRU 510 may identify a plurality of constellations (e.g., such as constellations 502, 504). Each of the plurality of constellations may be associated with a corresponding orbit. The WTRU 510 may determine an orbit associated with each of the plurality of constellations. The orbit may define a path that satellites in the constellation follow. An elevation angle may be measured between a WTRU (e.g., such as WTRU 510) and the orbit. The elevation angle may be an average elevation angle of two or more satellites within a respective constellation. An average elevation angle may be an average of the elevations angles of satellites within a constellation. For example, the elevation angle may be measured from a line perpendicular to the earth at the WTRU to a line between a satellite in the constellation. The WTRU 510 may determine the elevation angle associated with each of the plurality of constellations. A first constellation of the plurality of constellations (e.g., constellation 502) may be associated with a first orbit (e.g., orbit A). Stated differently, the satellites in the first constellation may move along a path defined by the first orbit. The constellation 502 may be at a first elevation angle, OA, from the WTRU 510. For example, the satellites of constellation 502 may have an average elevation angle of OA with respect to WTRU 510. A second constellation of the plurality of constellations (e.g., constellation 504) may be associated with a second orbit (e.g., orbit B). Stated differently, the satellites in the second constellation may move along a path defined by the second orbit. The constellation 504 may be at a second elevation angle, OB, from the WTRU 510. For example, the satellites of constellation 504 may have an average elevation angle of OB with respect to WTRU 510. The WTRU 510 may be at an orbit edge (e.g., an edge of one or more of constellation 502 or constellation 504). When the WTRU 510 is at the orbit edge, the WTRU 510 may have visibility to two or more satellites (e.g., from multiple constellations).

The WTRU 510 may determine whether each of the plurality of constellations are viable. A constellation may be viable if the constellation is a candidate for selection. If more than one constellation is viable, the WTRU 510 may select between the viable constellations. The WTRU 510 may select a constellation from the plurality of constellations based on one or more of determined elevation angles, received signal received power (RSRP)/received signal received quality (RSRQ), service need, link budget(s), elevation angles, and/or additional link constraints. The WTRU 510 may identify a plurality of candidate satellites within the selected constellation. The WTRU 510 may determine which of the plurality of satellites to select within the selected constellation. The WTRU 510 may rank the plurality of satellites based on received signal power and/or quality.

Figure 5B:
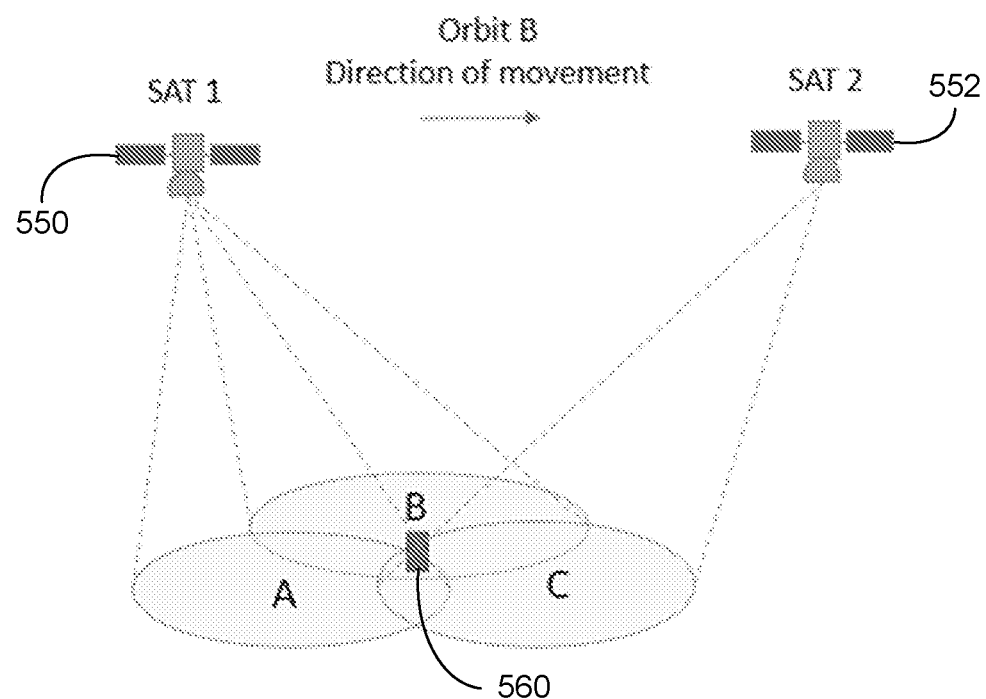
FIG. 5B shows example footprints of satellites within an orbit.

FIG. 5B shows example footprints of satellites 550, 552 within a constellation. Each satellite 550, 552 may include one or more cells. Each cell may provide a beam that produces a footprint (e.g., such as footprints A, B, C). A WTRU 560 may be located within one or more footprints. For example, the WTRU 560 may be within footprint A of a first satellite 550, footprint B of the first satellite 550, and/or footprint C of a second satellite 552. The WTRU 560 may determine Footprint A may be provided by a first cell (e.g., a beam of the first cell) of the first satellite 550. Footprint B may be provided by a second cell (e.g., a beam of the second cell) of the first satellite 550. Footprint C may be provided by a first cell (e.g., a beam of the first cell) of the second satellite 560. The WTRU 560 may examine the candidate beams within the selected constellation. The WTRU 560 may determine a weighted sum of metrics $\Sigma W_i M_i$ for the candidate beams, where W refers to the multiplicative weight to be applied for metric M. Metric M may include one or more of the following: link elevation angle, prevailing load intensity of spotbeam, penalty factor to apply for using an edge link, dwelling duration, link switch probability, etc. For example, each metric may be assigned a weight for each candidate beam.

For example, the WTRU 560 may apply respective weights $Weight_{Elevation}$ of ($W_{E1}$, $W_{E2}$, $W_{E3}$, $W_{E4}$) during link selection or reselection for measured elevation angles (e.g., such as $Angle_1^\circ$ to $Angle_2^\circ$, $Angle_2^\circ$ to $Angle_3^\circ$, $Angle_3^\circ$ to $Angle_4^\circ$, <$Angle_4^\circ$ respectively).

One or more weights may be applied for reduction in switching and/or links that maximize dwell/dwelling duration. The dwelling duration may refer to an estimated or expected time the WTRU determines it would be able to remain connected to and/or send/receive signals to/from a satellite, for example based on the assistance information. The WTRU 560 may apply the respective weights. The WTRU 560 may prioritize one or more factors when applying the respective weights. The WTRU 560 may apply the respective weights to prioritize one or more of dwelling duration, elevation angle, spotbeam load intensity, edge link, and/or link switch probability. In an example, a WTRU (e.g., such as WTRU 560) may prioritize dwelling duration when selecting a cell. Even though beam C may have a better RSRP/RSRQ, the second satellite 552 may be receding (e.g., moving away from WTRU 560). The WTRU 560 may select beam B based on the second satellite 552 receding and/or other factors.

Figure 6:
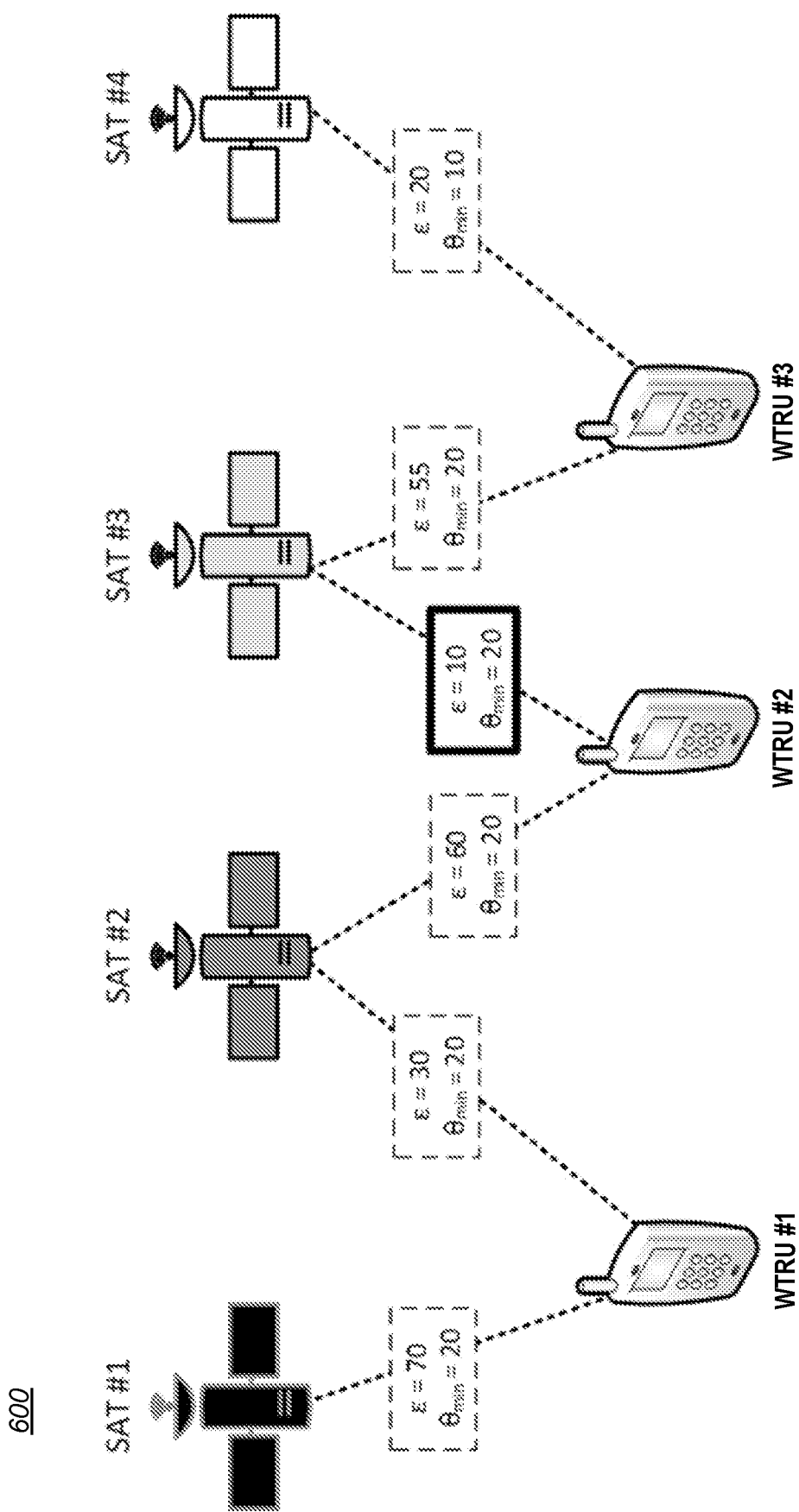
FIG. 6 shows example weighted cell selection and reselection.

FIG. 6 shows an example scenario 600 of multiple WTRUs identifying candidate satellites based on measured elevation angle and minimum elevation angle required per system information. WTRU #1 sees SAT #1 and SAT #2 as candidates, WTRU #2 may identify SAT #2 as the only candidate, whereas WTRU #3 may identify SAT #3 and SAT #4 as candidates. Though WTRU #2 may observe SAT #3 in the horizon, SAT #3 may be excluded from the candidate list for WTRU #2, due to the measured elevation angle not meeting the minimum elevation angle criteria. FIG. 6 shows satellite on a single orbit. In an example, if the WTRU determines that two or more satellites are viable, the WTRU may determine that at least one Edge exists between the WTRU and each satellite transmitter. An Edge may exist between a WTRU and a transmitter of a satellite if they are visible to each other. As shown in FIG. 4, a WTRU may be at an orbit edge and may have visibility to more than two satellites. In such case, the WTRU may have more than one Edge. The WTRU may rank the list of satellites in descending order of received signal power and/or quality. The WTRU may consider (e.g., only consider) those links with minimum acceptable received power (RSRP) or received signal quality (RSRQ).

In an example, a WTRU may receive, e.g., via system information, load intensity per spotbeam. The load intensity level for a spotbeam may indicate the spotbeam's capability to handle new connections. For example, the load intensity may indicate one or more of the following: composite utilization, hardware loading, air interface utilization, processor loading, available system capacity, etc. The WTRU may be provided with constellation topology assistance information (e.g., satellite ephemeris data, group common timing offset, etc.) via system information and/or via dedicated signaling. When used herein, the terms assistance information, satellite assistance information, constellation assistance information, constellation topology assistance information, etc. may be used to refer to any information provided by a network for assisting a WTRU in identifying, tracking, measuring, and/or selecting one or more satellite constellations for purposes of establishing communications (e.g., for cell selection/reselection). Examples of satellite assistance information may include one or more of satellite ephemeris data, group common timing offset, load information for the elevation angle information, geo-fencing information, satellite configuration information (e.g., load information for the satellite, satellite type/class, satellite capabilities, etc.) and/or the like. Although some examples here may be described using examples of certain types of satellite assistance information (e.g., elevation angle), these examples may be equally applicable to satellite assistance information more generally or other specific types of satellite assistance information (e.g., geo-fencing information).

The WTRU may determine the constellation topology via inference over a period. For example, the WTRU may infer the constellation topology via measurements and reception of system information from several satellites. The WTRU may determine visible satellites and/or elevation angles from satellite assistance information, constellation topology, and/or via measurements.

In an example, the WTRUs receive, e.g., via system information or dedicated signaling, weights to apply for link access for grades of elevation angle, penalty values for edge-links and weights to apply per load-intensity level per spotbeam. The weights to apply may be provided via constellation assistance information. For example, the WTRU may apply respective weights $\text{Weight}_{Elevation}$ of ($W_{E1}$, $W_{E2}$, $W_{E3}$, $W_{E4}$) during link selection or reselection for measured elevation angles of ($\text{Angle}_1^\circ$ to $\text{Angle}_2^\circ$, $\text{Angle}_2^\circ$ to $\text{Angle}_3^\circ$, $\text{Angle}_3^\circ$ to $\text{Angle}_4^\circ$)<$\text{Angle}_4^\circ$ respectively. In an example, the WTRUs may apply a penalty to the evaluated link if the link is an Edge and apply weights $\text{Weight}_{Load}$ of ($W_{L1}$, $W_{L2}$, $W_{L3}$, $W_{L4}$) during link selection or reselection for measured loading of ($\text{Load}_1$ to $\text{Load}_2$, $\text{Load}_2$ to $\text{Load}_3$, $\text{Load}_3$ to $\text{Load}_4$, >$\text{Load}_4$) respectively. Similarly, weights may be applied for reduction in switching, and links that maximize dwell duration.

In an example, the WTRU may perform a weighted selection of an orbit and may perform a selection of the best link within the orbit. If there are multiple edges viable, the WTRU may select the edge at first that has the maximum "average elevation angle" with respect to the pair of satellites forming the edge. After selecting the Edge that has maximum "average elevation angle", the WTRU may select the link within the selected Edge that has the maximum weighted sum of metrics $\Sigma W_i M_i$, where W may refer to the multiplicative weight to be applied for metric M. Metric M may include one or more of the following: link elevation angle, prevailing load intensity of spotbeam, penalty factor to apply for using an edge link, dwelling duration, link switch probability etc. The WTRU may perform selection or reselection evaluation for a (e.g., each) spot beam that has been noted via system information acquisition.

Figure 7:
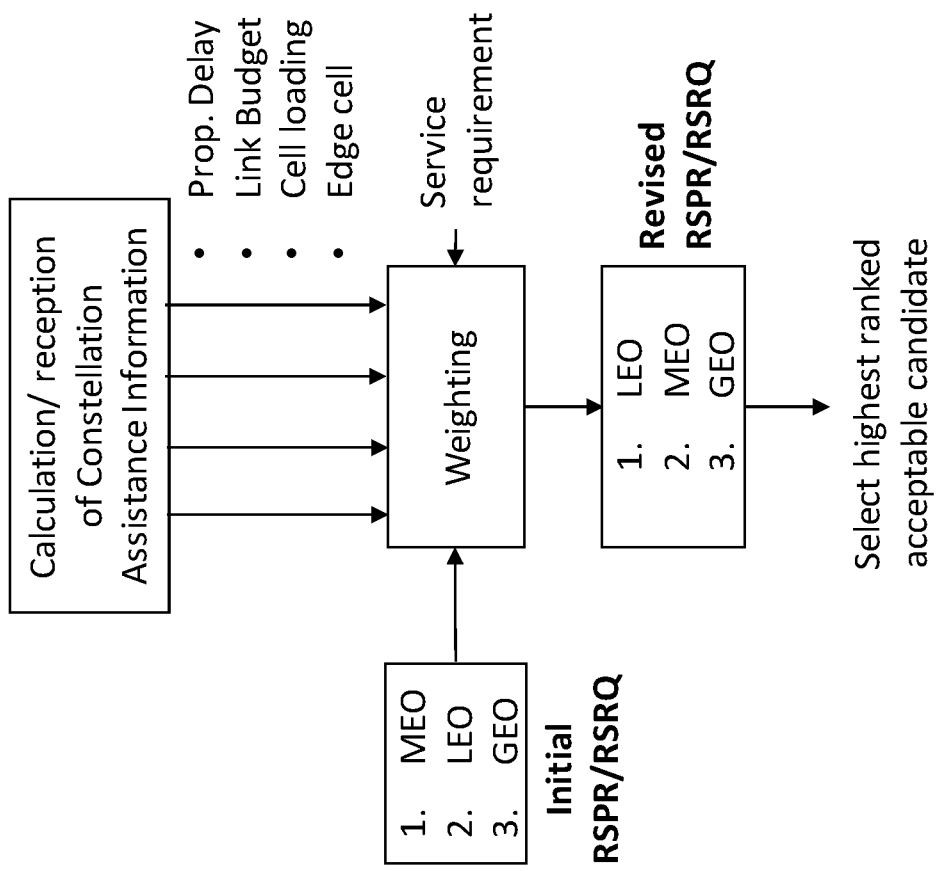
FIG. 7 shows an example service-based weighted cell selection.

FIG. 7 shows an example service-based weighted cell selection 700. Cell (re)selection may be performed based on service requirement(s). Multiple satellites may experience similar RSRP with different delays due to differences in, e.g., altitude, angle, pathloss, transmit power, payload configuration (regenerative or bent pipe) or any combination thereof. This may result in a WTRU selecting a satellite/airborne platform with a slightly better RSRP, at the expense of a much longer propagation delay. Circumstances may arise (e.g., the WTRU has delay sensitive services) where a WTRU may tolerate poorer channel conditions to fulfill latency requirements. Cell selection and reselection may be performed based at least in part on propagation delay.

As shown in FIG. 7, a WTRU may receive and/or calculate constellation assistance information. For example, the WTRU may receive system information that indicates the constellation assistance information. The WTRU may identify one or more (e.g., a plurality of) constellations using the constellation assistance information. The constellation assistance information may include one or more of satellite ephemeris data, group common timing offset, a propagation delay, a link budget, a cell loading, and/or an edge cell indicator. The WTRU may select a satellite constellation based on one or more of an elevation angle, a measured RSRP/RSRQ, or a link budget. The selected satellite constellation may include a plurality of candidate satellites. Each of the plurality of candidate satellites may include one or more cells (e.g., candidate beams). The candidate beams may be associated with a beam edge. The WTRU may measure the RSRP/RSRQ of each candidate beam. The WTRU may weight the RSRP/RSRQ measurement based on a service requirement. The service requirement may include a dwell duration, a link switch probability, and/or a QoS. The WTRU may rank the candidate beams based on the RSRP/RSRQ measurements and the service requirement. For example, the WTRU may prioritize one or more service requirements. The WTRU may determine a weighted ranking of each candidate beam. For example, the WTRU may determine the weighted ranking based on RSRP/RSRQ, candidate beam elevation angle, prevailing load intensities of the candidates, dwelling duration, link switch probability, and/or QoS associated with uplink data. The weighted ranking may be determined based on prioritization of one or more service requirements. The QoS associated with the uplink data may include a minimum propagation delay for the uplink data. The WTRU may select the highest ranked candidate beam for cell selection.

Propagation delay may be determined via (e.g., explicit) indication. Propagation delay may be inferred via topology information. For example, the propagation delay may be determined based on constellation topology assistance information that may be received via system information. Constellation topology assistance information may include satellite ephemeris data, angle to the WTRU, satellite payload configuration such as bent-pipe or regenerative, altitude, and//or location relative to the WTRU. For example, the propagation delay may be determined via measurements and reception of system information from several satellites. The WTRU may determine visible satellites and/or elevation angles from topology configured or via measurements. The propagation delay may be determined based on timing information, such as timing advance command received during RACH. The propagation delay may be inferred over a period, for example, via measurements and reception of system information from multiple satellites.

Upon cell selection/reselection, the propagation delay information can be used, in addition to or in lieu of, RSRP to select a cell, spot beam or satellite/airborne platform. If a cell, spot beam or satellite/airborne platform fails to meet the latency requirements due to propagation delay, a penalty may be applied (e.g., IA a delay weighting metric) or may be discounted entirely. For example, the WTRU may examine QoS and latency requirements of the data to transmit and select accordingly.

A similar function can be applied in the downlink, where paging information may indicate to the WTRU the latency requirements of data. The WTRU may apply latency requirements to cell selection and/or reselection. The WTRU may delay the paging response message to perform a handover to a more appropriate cell. For example, the WTRU may delay the paging response message to perform a handover to a more appropriate cell that meets the latency requirements. In an example, if the difference in propagation delay is greater than such a handover delay, the WTRU may perform a handover.

To detect the cell ID, the WTRU may detect PSS and SSS. For non-geostationary satellites, there is a potential for very high doppler shifts on the order of +/−48 kHz for LEO S band operating at 2 GHz and +/−480 kHz for LEO Ka band operating at 20 GHz. The frequency error robustness in NR may be 5 ppm (10 kHz for S band and 100 kHz for Ka band). If a WTRU is currently camped on a spot beam with knowledge of the doppler shift, the WTRU may apply such a shift as a baseline for synchronization to a spot-beam served by the same satellite or aerial platform. In an example, if the WTRU is re-selecting to a spot beam on a satellite in the same constellation, with similar orbital path, altitude, and velocity, the WTRU may apply knowledge of the doppler shift experienced on the currently camped on cell as a baseline.

Cell (re)selection may be performed cross-border. Due to the large geographic locations covered by individual spot beams (potentially 1000 km diameter in the case of GEO satellites), a WTRU may traverse into a different country and/or roaming/billing region while being serviced by the same spot beam. The location and time of cells/spot beams that serve such regions may be determined by the network. The WTRU can be notified (e.g., via system information) if the WTRU is about to select such a cell/spot beam. The satellite/aerial platform may discourage the selection of such cells/spot beams. For example, the satellite/aerial platform may apply weighting penalties for selecting a spot beam that is currently servicing across billing/roaming regions (e.g., a country border). For example, the satellite/aerial platform may bar the WTRU from accessing the cell/spot beam. Geographic location information may be requested and/or inferred.

If the WTRU is currently camped on a cell/spot beam which services across billing/roaming regions, the WTRU may be notified by the serving cell/spot beam (e.g., via system information), of the geographical boundaries of the billing/roaming regions. If the WTRU moves from one region to another, a tracking update may be performed.

Figure 8:
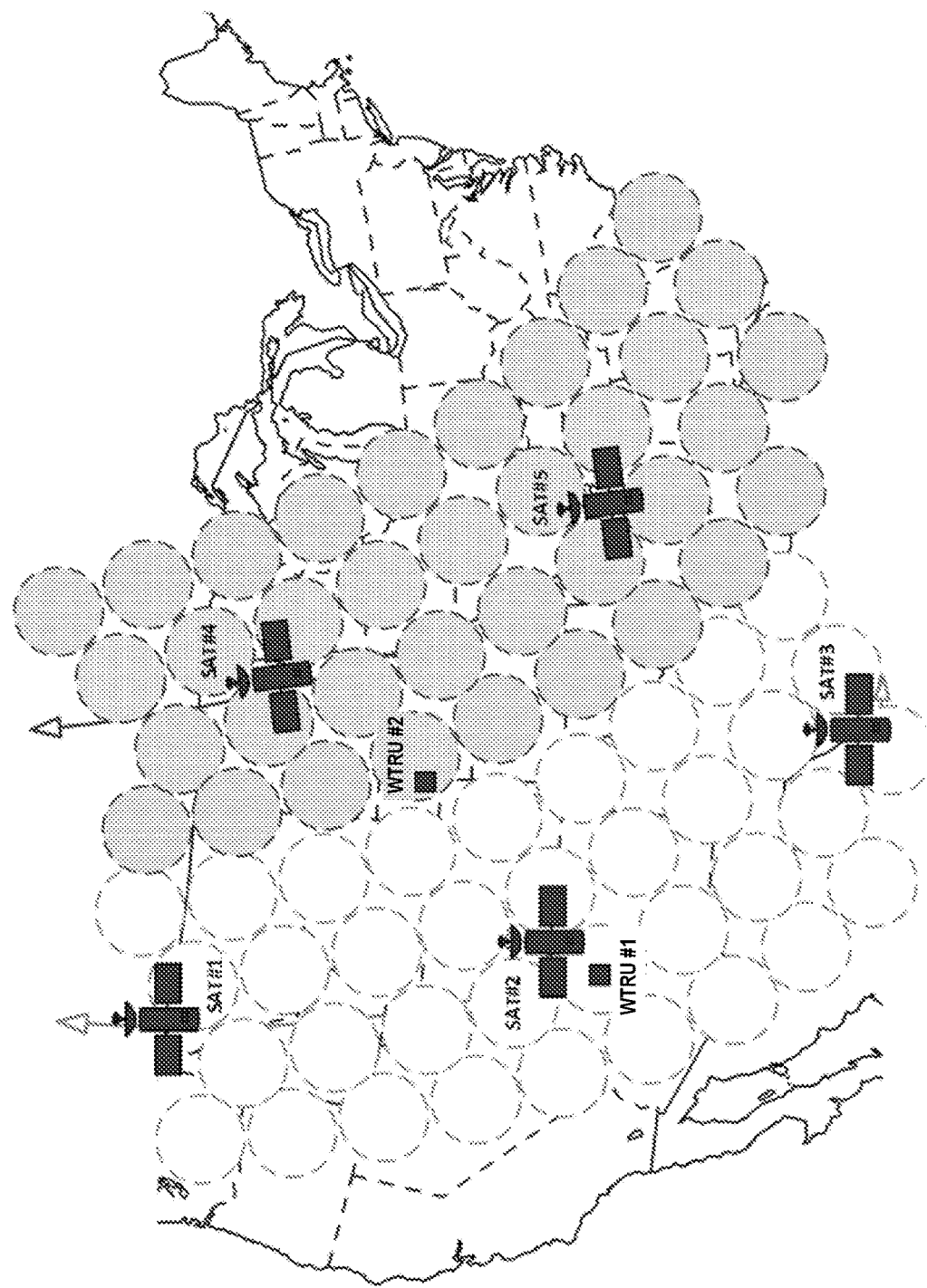
FIG. 8 shows example geo-fencing WTRUs under a satellite footprint.

FIG. 8 depicts an example scenario 800 having multiple WTRUs and multiple satellite constellations. Paging area may be mapped with geo-fence. The satellite's footprint may be associated with several equally or unequally sized spot-beams as illustrated in FIG. 8. A satellite's footprint may have a sweep width and under the footprint, the beam may be organized into one or more spotbeams. A satellite constellation may be designed as a collection of satellites covering a predetermined area using one or more orbits. As shown in FIG. 8, an example constellation may have two orbits, each having a sweep width. Satellites, SAT #1, SAT #2 and SAT #3 are shown to cover orbit #1 while satellites, SAT #4 and SAT #5 service via orbit #2. The sweep widths of the respective orbits #1 and #2 are shown in FIG. 8 with differently shaded spotbeams and the direction of the satellites are shown with pointed arrows. A satellite's position in time and space may be highly deterministic, and a specific satellite within a constellation over a specific geographical location on earth may be highly deterministic. As shown in FIG. 8, there may be multiple WTRUs, such as WTRU #1 and WTRU #2, noted by shaded small squares. WTRU #1 may be very near satellite SAT #2 and hence almost certainly serviced by SAT #2 in orbit #1 whereas WTRU #2 may be at the edge of orbits #1 and #2 and likely serviced by either SAT #2 or SAT #4 or both.

In an example, the coverage provided by a constellation of satellites may be semi-statically divided into N equal or unequal areas defined by geographical fences. When used herein, the terms semi-statically may refer to a higher layer configuration such as a radio resource control (RRC) configuration. The geo-fenced areas can form any arbitrary shape or form and the surface area $S_{Area,i}$ covered by a specific geo-fence $G_i$, $1 \le i \le N$, can be smaller or larger than other surface areas among the N geo-fences. A geo-fence $G_j$, $1 \le j \le N$, may be small in surface area due to $G_1$, $1 \le k \le N$, for example, overlapping partially or fully the highly dense State of New Jersey whereas a geo-fence $G_k$, $1 \le k \le N$, may be very large in surface area due to $G_k$, for example, overlapping fully or partially the sparsely populated states of Wyoming and Montana. One or more geo-fences, located within proximity of each other, maybe grouped into a Zone. The N geo-fences may be grouped into a total of T zones, $T \le N$, Zone $Z_i$, $1 \le i \le T$, may have more geo-fences compared with zone $Z_j$, $1 \le j \le T$.

In an example, a geo-fence's boundaries may be scaled down (decreased) or scaled up (increased) based on the relative velocity of the WTRU. For example, a WTRU at high velocity of 250 kph may scale down its serving geo-fence boundary, whereas a WTRU at low velocity of 25 kph may scale up its serving geo-fence boundary. Further, the scaling up or scaling down may be applicable only in specific zones. For example, the WTRUs may be required to scale up or scale down a servicing geo-fence when that geo-fence is inside a zone $Z_L$ covering partially or fully the states of Montana, Alberta and Saskatchewan. Scaling may be skipped when the serving geo-fence is inside a different zone $Z_S$ covering partially or fully the states of Massachusetts, Connecticut and New York. In an example, the N geo-fences and/or T zones may be reconfigured (e.g., redesigned) by the network periodically or based on internal events to contain N' geo-fences, N≠N', and T' zones, T≠T'. For example, the network may redesign the number of zones from T to T', T'<T, between 8:00 PM pacific standard time (PST) and 05:00 AM PST.

The currently valid terrain map containing the T zones and N geo-fences may be signaled to the WTRU by the network at the time of NAS: ATTACH and/or NAS: TA UPDATE and/or NAS: RNA UPDATE. The currently valid terrain map may be broadcast to the WTRUs via system information. A default terrain map may be agreed upon between the network and the WTRUs and preconfigured (e.g., at the WTRUs' non-volatile memory statically). The terrain map may be configured at the WTRUs via the application layers of the WTRU. The network may signal the updated terrain map to the WTRU when the geo-fences and/or zones are redesigned. The terrain map may be WTRU specific and, the terrain map may be signaled to the WTRU at the time of NAS: ATTACH and/or NAS: TA UPDATE and/or NAS: RNA UPDATE.

In an example, the WTRU may determine its current geo-fence and zone after acquiring its current location using a GNSS receiver. The WTRU may acquire location periodically, aperiodically, or on demand. For example, the WTRU may acquire the GNSS location every 2 seconds and may be commanded to acquire by the network or the application on demand for corrective purposes. The WTRU may track its serving geo-fence periodically. The WTRU may map its current GNSS acquired location to a specific geo-fence in the terrain map configured by the network. The mapped geo-fence is its serving geo-fence and. A WTRU may be configured with a parameter PAGING_IND_FORMAT. This parameter may be signaled to the WTRU via system information, via a RRC dedicated signal, and/or via a NAS procedure. Parameter PAGING_IND_FORMAT may indicate a scalar value and may hold at least one of three possible values. A value of 0 may refer to GEO_FENCE_UPDATE, a value of 1 may refer to TA_RNA_UPDATE, and a value of 2 may refer to TA_RAN_GEO_FENCE_UPDATE. A value greater than 2 may not be precluded, and a corresponding definition may be predetermined and agreed between the network and WTRU in such case. If parameter PAGING_IND_FORMAT is not configured, the WTRU may default the parameter to 0.

As described herein, a spotbeam serviced by a satellite may be assigned a TAC or a RNA Code. The same TAC or RNA code may have been assigned to multiple spotbeams, or neighboring spotbeams may have been assigned unique TAC or RNA codes. If parameter PAGING_IND_FORMAT=0, the WTRU may transmit a NAS: GEO_FENCE_UPDATE to the network upon change of geo-fence only and may not transmit a NAS: TA UPDATE or NAS: RNA UPDATE upon a change of TAC or RNA code. If parameter PAGING_IND_FORMAT=1, the WTRU may transmit a NAS: TA UPDATE or NAS: RNA UPDATE on a condition that there is a change in TAC or RNA code and may not transmit a NAS: GEO_FENCE_UPDATE upon a change of geo-fence. If parameter PAGING_IND_FORMAT=2, the WTRU may transmit a NAS: TA UPDATE or NAS: RNA UPDATE upon a change in TAC or RNA code and may transmit a NAS: GEO_FENCE_UPDATE upon a change of geo-fence.

The network may page the WTRU on (e.g., only on) the specific geo-fence and the specific satellite or satellites that covers the geo-fence at a specific time instance is deterministically known at the network. A WTRU that is stationary within a geo-fence may skip NAS: TA UPDATE or NAS: RNA UPDATE on a condition that the network sets parameter PAGING_ING_FORMAT to 0. The network may determine the current satellite serving the geo-fence and may route the PAGING message to the WTRU. This may reduce unnecessary signaling required on the uplink even though the spotbeams are constantly moving and TAC or RNA codes may constantly change. The stationary WTRU may limit the uplink access for network notification purposes.

The invention claimed is:

1. A wireless transmit/receive unit (WTRU) comprising:
a processor configured to:
  select a satellite constellation, wherein the satellite constellation includes a plurality of candidate beams;
  perform a signal measurement for each of the plurality of candidate beams;
  determine a weighted ranking of the plurality of candidate beams based at least on the signal measurement for each of the plurality of candidate beams and service information;
  select a beam for cell selection based on the beam having a highest rank in the weighted ranking of the plurality of candidate beams; and
  transmit data using the selected beam from the plurality of candidate beams.

2. The WTRU of claim 1, wherein the signal measurement is one or more of: a received signal received power (RSRP) or a received signal received quality (RSRQ).

3. The WTRU of claim 1, wherein the-service information comprises one or more of: a dwelling duration, a link switch probability, or a quality of service (QoS) parameter associated with uplink data.

4. The WTRU of claim 1, wherein the processor is further configured to receive a system information that indicates constellation assistance information.

5. The WTRU of claim 4, wherein the processor is further configured to select the satellite constellation using the constellation assistance information.

6. The WTRU of claim 5, wherein the processor is further configured to select the satellite constellation based on the satellite constellation having a smaller average elevation angle than other satellite constellations.

7. The WTRU of claim 5, wherein the processor is further configured to determine the satellite constellation using one or more of a measurement and the system information.

8. The WTRU of claim 1, wherein the processor is further configured to determine that the WTRU is within a satellite footprint edge.

9. The WTRU of claim 1, wherein the plurality of candidate beams is associated with a beam edge, and wherein the beam has a maximum weighted ranking of the plurality of candidate beams associated with the beam edge.

10. The WTRU of claim 1, wherein the weighted ranking is further based on elevation angles of the plurality of candidate beams and prevailing load intensities of the plurality of candidate beams.

11. A method performed by a wireless transmit/receive unit (WTRU) for selecting a beam associated with a satellite constellation, the method comprising:
- selecting a satellite constellation, wherein the satellite constellation includes a plurality of candidate beams;
- performing a signal measurement for each of the plurality of candidate beams;
- determining a weighted ranking of the plurality of candidate beams based at least on the signal measurement for each of the plurality of candidate beams and service information;
- selecting a beam for cell selection based on the beam having a highest rank in the weighted ranking of the plurality of candidate beams; and
- transmitting data using the selected beam from the plurality of candidate beams.

12. The method of claim 11, wherein the signal measurement is one or more of: a received signal received power (RSRP) or a received signal received quality (RSRQ).

13. The method of claim 11, wherein the service information comprises one or more of: a dwelling duration, a link switch probability, or a quality of service (QoS) parameter associated with uplink data.

14. The method of claim 11, wherein the method further comprises receiving system information that indicates constellation assistance information.

15. The method of claim 14, wherein the method further comprises selecting the satellite constellation using the constellation assistance information.

16. The method of claim 15, wherein the method further comprises determining the satellite constellation using one or more of a measurement and the system information.

17. The method of claim 15, wherein selecting the satellite constellation is based on the satellite constellation having a smaller average elevation angle than other satellite constellations.

18. The method of claim 11, wherein the method further comprises determining that the WTRU is within a satellite footprint edge.

19. The method of claim 11, wherein the plurality of candidate beams is associated with a beam edge.

20. The method of claim 11, wherein the weighted ranking is further based on elevation angles of the plurality of candidate beams and prevailing load intensities of the plurality of candidate beams.

* * * * *